United States Patent [19]
Curry

[11] Patent Number: 5,479,584
[45] Date of Patent: Dec. 26, 1995

[54] ENHANCED FIDELITY REPRODUCTION OF IMAGES WITH DEVICE INDEPENDENT NUMERICAL SAMPLE OUTPUT

[75] Inventor: Douglas N. Curry, Menlo Park, Calif.

[73] Assignee: Xerox Corporation, Stamford, Conn.

[21] Appl. No.: 937,631

[22] Filed: Aug. 28, 1992

[51] Int. Cl.⁶ .................................................. G06F 15/00
[52] U.S. Cl. .......................................... 395/102; 395/109
[58] Field of Search ................................ 382/54, 30, 27; 358/428, 463, 447, 456, 458, 455, 296, 300, 302; 345/136, 137, 138, 132, 136, 137, 139, 147, 114; 395/157, 128, 102, 109, 101, 108, 111, 117, 132, 135, 143; 348/25, 26, 625

[56] References Cited

U.S. PATENT DOCUMENTS

| | | | |
|---|---|---|---|
| 3,573,789 | 4/1971 | Sharp et al. | 340/324 |
| 4,355,337 | 10/1982 | Sekigawa | 358/284 |
| 4,437,122 | 3/1984 | Walsh et al. | 358/166 |
| 4,450,483 | 5/1984 | Coviello | 358/166 |
| 4,486,785 | 12/1984 | Lasher et al. | 358/284 |
| 4,780,711 | 10/1988 | Doumas | 340/728 |
| 4,847,641 | 7/1989 | Tung | 346/154 |
| 4,908,780 | 3/1990 | Priem et al. | 364/521 |
| 5,029,108 | 7/1991 | Lung | 364/519 |
| 5,138,339 | 8/1992 | Curry et al. | 346/108 |
| 5,329,599 | 7/1994 | Curry et al. | 382/54 |

FOREIGN PATENT DOCUMENTS

| | | | |
|---|---|---|---|
| 234590A2 | 9/1987 | European Pat. Off. | H04N 1/40 |
| 505113A2 | 9/1992 | European Pat. Off. | H04N 1/393 |

Primary Examiner—Raymond J. Bayerl
Assistant Examiner—Dov Popovici

[57] ABSTRACT

An image enhancement method in which low-resolution bitmapped images may be enhanced and converted into gray images for printing on high-addressability printing and display systems. The method uses template matching to determine a rendering goal, and converts the bitmap pixel into a numerical, multiple-bit-per-pixel sampled value that is independent of the system it may ultimately be printed on. Unlike previous template matching methods which determined an enhanced pixel pattern output which was sent directly to the photoreceptor of a specific printer, the sampled data value of the present invention will require processing by the printer for its own particular characteristics before being sent to the photoreceptor. The sample data value may be sent directly to a printer imaging processor or stored via a network.

12 Claims, 6 Drawing Sheets

ENHANCED FIDELITY REPRODUCTION OF IMAGES WITH DEVICE INDEPENDENT NUMERICAL SAMPLE OUTPUT

FIELD OF THE INVENTION

The present invention relates to improvement in the display of raster images, and in particular to enhancing the exposure fidelity of binary images in increased precision printing systems. More specifically, the invention pertains to an economical and technically attractive method and means for producing high fidelity numerical sampled image output data for microaddressable optical printers from low fidelity bitmap images.

BACKGROUND OF THE INVENTION

In existing printing systems, bitmapped data are sometimes obtained from fairly low resolution image generating sources. One type of source, low resolution scanners, of which there is already a large infrastructure, converts information on a scanned page to sampled image data, but then frequently does other processing on the image, such as halftoning or thresholding, which reduces information content and produces a low resolution bitmap image. Another kind of source, image generators, may also produce a low resolution bitmap from its respective source information. These low resolution bitmaps are generally intended to be printed on low resolution printers.

These low resolution bitmaps can be characterized as having artifacts such as jaggies (visible stairstepping in almost horizontal or almost vertical edges, for example), and are also frequently device dependent, being generated according to the characteristics of a particular printer and sent directly to that printer's photoreceptor. For example, the image may be processed to be printed on a write-black or write-white bitmap printer at a particular resolution.

Once the image is converted to a bitmap representation the loss of fidelity due to the coarseness of the bitmap is generally irreversible. However, the stairstepping artifact, for example, has proven to be identifiable to a limited extent, and therefore somewhat removable in a high addressability printer.

High addressability display or printing systems expect to utilize high resolution bitmapped or numerical data representing an image, such as provided by a high resolution scanner or image generator.

In order to print low resolution bitmaps on a high addressability printer, the images must be processed in order to enhance the fidelity and increase the density of the low resolution bitmaps. A limited amount of fidelity may be restored to the low resolution image using a bitmap image enhancement technique such as template matching. Such enhancement techniques generally produce an enhanced resolution bitmap output by providing an enhanced bit or set of bits for each bit of the input image. These bit patterns are also typically dependent upon the characteristics of the photoreceptor of the printer that the enhanced image is developed for.

The present invention provides a method for enhancing the fidelity of these low resolution bitmapped images for printing on high-addressability printing systems by providing a multiple-bit-per-pixel sampled image output similar to that produced by a scanner which has not converted the image into a bitmap. Because this enhancement data is numerical, it is not dependent upon the characteristics of any particular system on which it will be printed. Provided to the high-addressability printer is enhancement data which comprises a device independent, numerical output sample for each pixel location at the resolution of the original bitmap image. Armed with that value, the printer intelligence may render that pixel in accordance with the printer's unique characteristics.

Microaddressable printers and other types of high addressability display systems can operate in an "overscanned" mode to render images by scanning one or more intensity modulated scan spots over a photosensitive recording medium in accordance with a scan pattern that causes the spot or spots to superimpose multiple discrete exposures on the recording medium on centers that are separated by a pitch distance that is significantly less than the effective spatial diameter of the scan spot (i.e., the full width/half maximum (FWHM) diameter of a gaussian scan spot). The technique of microaddressability via overscanned illumination is more fully described in the copending, coassigned U.S. Pat. No. 5,138,339 of D. N. Curry et al., entitled "MICROADDRESSABILITY VIA OVERSCANNED ILLUMINATION FOR OPTICAL PRINTERS AND THE LIKE HAVING HIGH GAMMA PHOTOSENSITIVE RECORDING MEDIA", incorporated herein by reference.

For high quality printing, high-addressability printing systems, whether they are overscanned or not, require a high fidelity input source, such as sampled image data or a high resolution bitmap. A typical high resolution scanner is capable of producing high resolution, grayscale sampled image data at 800 spots per inch (spi), for instance, with each spot of picture element ("pixel") represented by multiple bits. However, a large number of existing image scanners produce low resolution bitmapped image data at 300 or 400 spi with one bit per pixel, which is not enough resolution or fidelity to eliminate unwanted artifacts induced by the coarseness of the information, such as stairstepping on angled contours.

It is an object of the present invention to provide device independent sampled multiple-bit-per-pixel numerical output for a high-addressability printer from low resolution bitmap images, such as those produced by the current infrastructure of existing scanners or image generators. In this way, existing low resolution bitmapped image generators would be able to drive high-addressability printers that process sampled data, and existing low resolution bitmap images would be printable on high-addressability printers.

As discussed above, image enhancement methods such as template matching and gradient mask convolution techniques have been proposed to enhance images and increase resolution by more precisely controlling the size, positioning, and number of picture elements representing each enhanced pixel that are printed on a xerographic photoreceptor to render bitmapped images. However, all have the characteristic that they generally produce pulse width modulated data streams representing pixel patterns for a laser diode in the fast scan direction.

For example, Walsh et al., U.S. Pat. No. 4,437,122, describes a method of enhancing the resolution and quality of image elements of a system receiving video display pixel information by matching the input data to predetermined templates and providing enhanced binary output pixels. Tung, U.S. Pat. No. 4,847,641, describes a technique for enhancing the printing of bitmapped images by piecewise matching of the bitmap with predetermined stored templates of patterns to detect the occurrence of preselected bitmap features. A plurality of compensation subcells are generated for the printer in response to signals indicating matching bit patterns.

Another fidelity enhancement technique, described in copending, coassigned U.S Pat. No. 5,329,599 of D. N. Curry et al., entitled "ENHANCED FIDELITY REPRODUCTION OF IMAGES BY HIERARCHICAL TEMPLATE MATCHING," incorporated herein by reference, provides enhancement for a 2× overscanned microaddressable printer, involving template matching and production of enhanced pixels in two dimensions.

Lung, U.S. Pat. No. 5,029,108, describes a gradient mask convolution technique for identifying pixels to be adjusted for enhancement, but once again uses this information to produce a device dependent, specific code, output.

Template matching and gradient mask convolution techniques effectively overcome some of the sampling errors that are caused by the use of input data that are too coarse to avoid stairstepping or jaggies in the image. However, techniques such as described above typically alter the resolution and produce an enhanced pixel bitmap output which is dependent upon the characteristics of the printer that it is being sent to. For each printer family, for example, a write-white or write-black family, a separate set of enhanced pixels must be developed which is unique for that family.

The present invention, however, after identifying a pixel to be enhanced, uses the information to produce a single device-independent, multiple-bit binary number representing the pixel. By nature this binary number cannot directly drive the output of a binary display or printer. On the contrary, this technique produces a multiple-bit-per-pixel sampled output, similar to sampled data an input scanner would produce. The sampled data requires further processing before it may be printed on a printer; i.e., it is device independent gray data, which can be resolution converted, eroded, dilated, thresholded, or halftoned. By storing the sampled representation instead of the bitmapped representation inside the image generator, fidelity and machine independence are maintained. The conversion to bitmap should be executed by the printer, closer to the photoreceptor, where the high capacity bitmap resulting from the conversion is stored only on the photoreceptor. It is an object of the present invention to provide printer independent image enhancement data in the form of numerical sample output data, which may be independently received for processing by a variety of high-addressability printers that can process sampled data.

Another aspect of the invention is based on the recognition that existing bitmap enhancement methods which produce output patterns are inherently inefficient. Many essentially redundant patterns are produced, so that the resolution of enhancements for n bits per pixel is (n+1) levels. Gray data is logarithmically encoded, producing $2^n$ levels for n bits per pixel. It therefore is a further object of this invention to eliminate redundancy in the enhancement information by providing pixel enhancement information as numerical sample data, thereby increasing the edge position precision of enhancements to $2^n$ for n bits per pixel.

SUMMARY OF THE INVENTION

The present invention provides a method for enhancing the contour fidelity of a reproduction of a bitmap image, independent of the printer that it will be reproduced on. The technique produces a printer-independent numerical sample data output, which may be determined to smooth contours and jagged or stair-stepped edges commonly found in low resolution bitmap images.

The method includes isolating a correctable pixel position within a window of pixels in a portion of an image, and determining enhancement data based on the pixels surrounding the correctable pixel. Multiple-bit-per-pixel sampled output data is determined for the correctable pixel, based on the enhancement data.

The following description, the drawings and the claims further set forth these and other objects, features and advantages of the invention.

DETAILED DESCRIPTION

A. General Features

Figure 1:
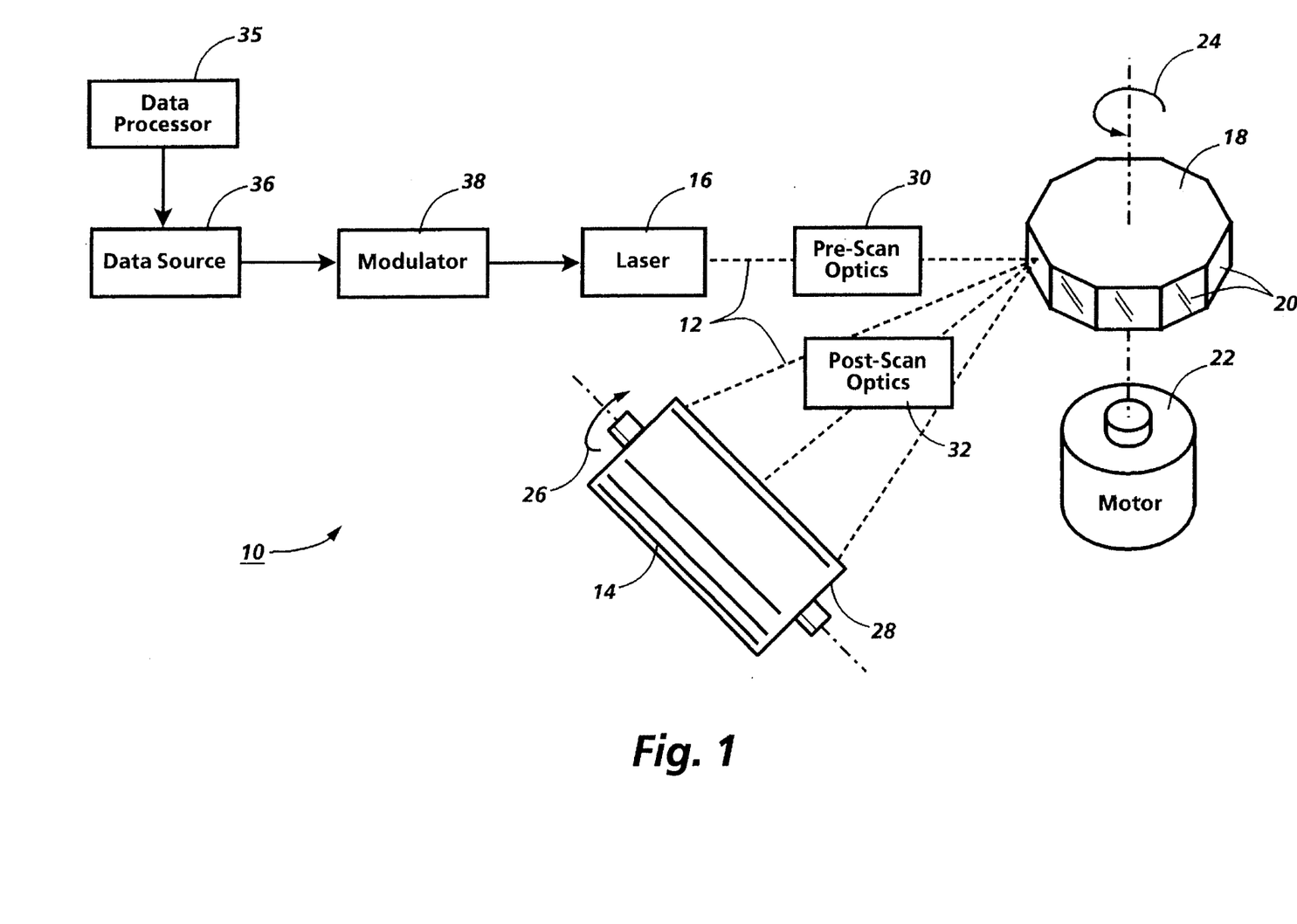
FIG. 1 shows general features of a high addressability laser printer.

FIG. 1 shows general features of a high-addressability laser printer. In FIG. 1, there is illustrated a more or less conventionally configured optical system 10 of a xerographic print engine (not shown). The flying spot raster output scanner (ROS) scans a data modulated light beam 12 over a xerographic photoreceptor 14 in accordance with a predetermined raster scanning pattern. To that end, the ROS comprises a laser diode 16 or emitting the light beam 12 in the visible or invisible (e.g., infrared) band of the spectrum, together with a polygon scanner 18 that has a plurality of nearly identical, mirror-like exterior sidewalls or "facets" 20.

In keeping with standard practices, there is a motor 22 for rotating the scanner 18 about its central axis, as indicated by the arrow 24, at a substantially constant angular velocity. The scanner 18 is optically aligned between the laser 16 and the photoreceptor 14, so its rotation causes the laser beam 12 to be intercepted and reflected from one after another of the scanner facets 20, with the result that the beam 12 is cyclically swept across the photoreceptor 14 in a fast scan direction. The photoreceptor 14, on the other hand, is advanced (by means not shown) simultaneously in an orthogonal, process direction at a substantially constant linear velocity, as indicated by the arrow 26, so the laser beam 12 scans the photoreceptor 14 in accordance with a raster scan pattern. As shown, the photoreceptor 14 is coated on a rotating drum 28, but it will be apparent that it also could be carried by a belt or any other suitable substrate.

Typically, the ROS additionally includes pre-scan optics 30 and post-scan optics 32 for bringing the laser beam 12 to a generally circular focus proximate the photoreceptor 14 and for providing any optical correction that may be needed to compensate for scanner wobble and other optical irregularities. Preferably, the optical aperture of the ROS is sufficiently large to avoid excessive truncation of the laser beam 12 because the beam 12 then comes to a generally circular or elliptical focus with a gaussian intensity profile. However, the broader aspects of this invention are not limited to any specific scan spot geometry or intensity profile. Accepted design principles indicate that the spatial frequency power spectrum of the scan spot profile should not have significant spatial frequency components outside the spatial frequency passband of the imaging system, but the scan spot can otherwise be tailored to satisfy a variety of system requirements.

The amplitude, duty cycle, and/or pulse width of the laser beam 12 is serially modulated (collectively referred to herein as "intensity modulation") in accordance with successive multiple-bit digital data values. These data values are clocked out of a data source 36 serially in response to data clock pulses which are time synchronized with the scan of the scan spot from bitmap-location to bitmap-location within the raster scan pattern. Thus, the data clock frequency can be selected (by means not shown)to map features onto the raster scan pattern at any desired magnification, using either the same or different magnifications in the fast scan and the process directions. The data may be processed by data processor 35, so the data source 36 generically represents any suitable source of raster data for intensity modulating the laser beam 12. The drive current for the laser diode 16 is serially modulated by modulator 38 in accordance with the data values chat are clocked out of the data source 36, thereby intensity modulating the laser beam 12 at the data clock rate in accordance with those data values.

The fast scan positioning precision of the print engine 10 can be increased, if desired, by dynamically adjusting the frequency of the data clock to compensate for positioning errors that tend to be caused by motor hunt (i.e., variations in the angular velocity of the scanner 18), polygon signature characteristics (variations in the angular velocities at which the different facets 20 of the scanner 18 sweep the scan spot across the photoreceptor 14 from a start of scan position to an end of scan position), and scan non-linearities (i.e., localized variations in the linear velocity of the fast scan, which are caused by variances in the geometric relationship of the scanner 18 to spatially distinct segments of any given scan line).

The pitch of the scan pattern for the printer 10 is selected to be significantly finer (i.e., smaller) than the FWHM diameter of the scan spot that is formed from the scan beam 12. This relatively fine pitch scan pattern causes the printer 10 to operate in an "overscanned" mode because the FWHM central core of the scan spot sweeps across spatially overlapping segments of the photoreceptor 14 during the scanning of spatially adjacent, neighboring scan lines. Overscanning slightly degrades the spatial frequency response of the printer 10 in the process direction. However, it has been found that the linearity of the addressability response of ROB printers, such as printer 10, increases rapidly as the ratio of the scan pitch to the FWHM diameter of the scan spot is reduced to progressively smaller, sub-unity values (i.e., increasing the overscan). In other words, it has been found that overscanning is the key to providing the essentially linear position control that enables discrete exposures to map image transitions onto a scan pattern at a sub-resolution precision. Thus, in the printer shown in FIG. 1, a relatively small loss of process direction frequency response is accepted to achieve substantially increased process direction addressability.

Figure 2:
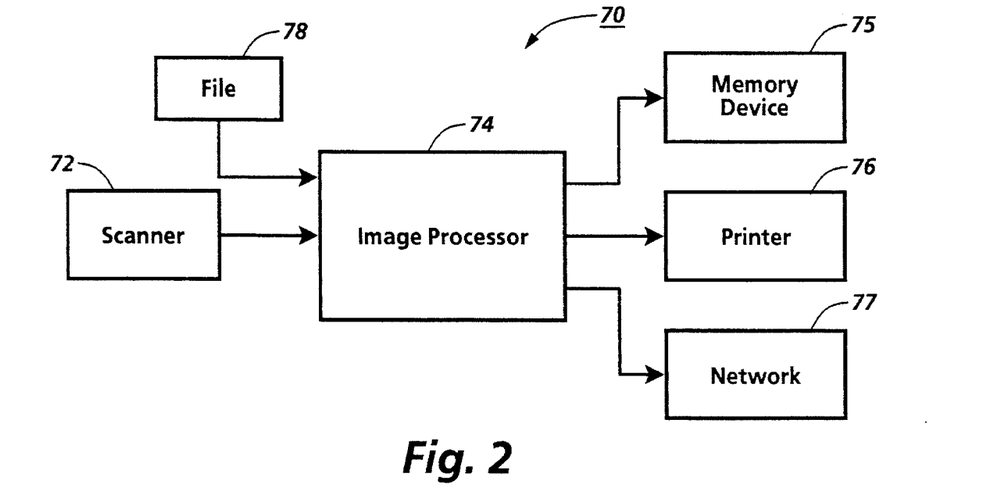
FIG. 2 shows an image processing system made up of an input subsystem, an image processor, and an output subsystem.

FIG. 2 shows an image processing system 70, made up of an input means, for example scanner 72, an image processing means 74, and an output means, such as printer 76. Scanner 72 performs all the scanner dependent operations, and printer 76 performs all the printer dependent operations. The image processor 74 performs all the independent, or generic operations.

In existing image generating systems, scanner 72 scans in the image data. In order to produce a bitmap, or low fidelity binary image file, from the scanned in data, the scanner effectively discards much information about the image. Once the image data is converted to a bitmapped representation, the loss of fidelity due to the coarseness of the bitmap is generally irreversible. Image processor 74 performs generic operations, and sends the bitmap to the printer 76, which might restore a limited amount of fidelity to contours in the bitmap image using a template matching and bitmap enhancement method, for example, as described in U.S. Pat. No. 5,229,599, previously incorporated, or a gradient mask technique, or other image enhancement method. The results of the enhancement are dependent upon the characteristics of the printer, and the enhanced results are sent directly to the photoreceptor of that printer via data source 36 as shown in FIG. 1.

In high-addressability printing systems, scanner 72 presents 8-bit sampled data outputs representing the image which are sent to a high-addressability printer 76. However, a large number of low resolution binary image files, and a large infrastructure of input means capable of producing these low resolution binary image files already exists. In order to process these files, previous methods have required an image processing system that was dependent on the printer characteristics. In the method of the present invention, a bitmap file 78 from a network or other source may be input to the image processor 74, as well as a high resolution sampled output file from scanner 72. The image processor includes operations which convert the bitmap file into a file of numerical sample, grayscale data values which represent the image by performing generic operations on the high resolution image.

These numeric values may then be stored in a memory device 75, or sent directly to a high-addressability printer or to some other printer over a network 77. Because the enhancement output data is numerical, it is not dependent upon characteristics of any particular printer. A file that is enhanced to sample data values according to the method of the invention will have essentially the same data format as a sample data file presented by a scanner before processing into a bitmap. When the image is to be printed, printer 76 must process the sample data for its own resolution and characteristics, such as shown by processor 35 in FIG. 1, before the data is provided to data source 36 for the photoreceptor.

Figure 3A:
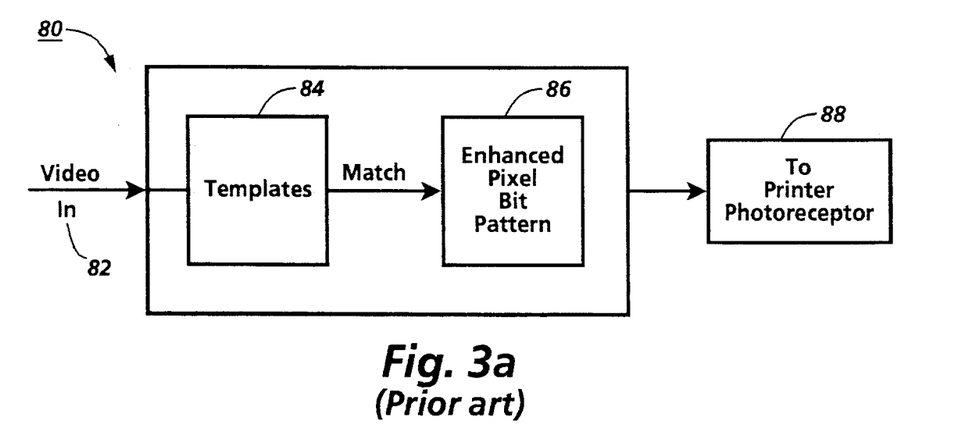
FIGS. 3(a) and (b) show image processing subsystems according to methods of prior art and the method of the present invention, respectively.
Figure 3B:
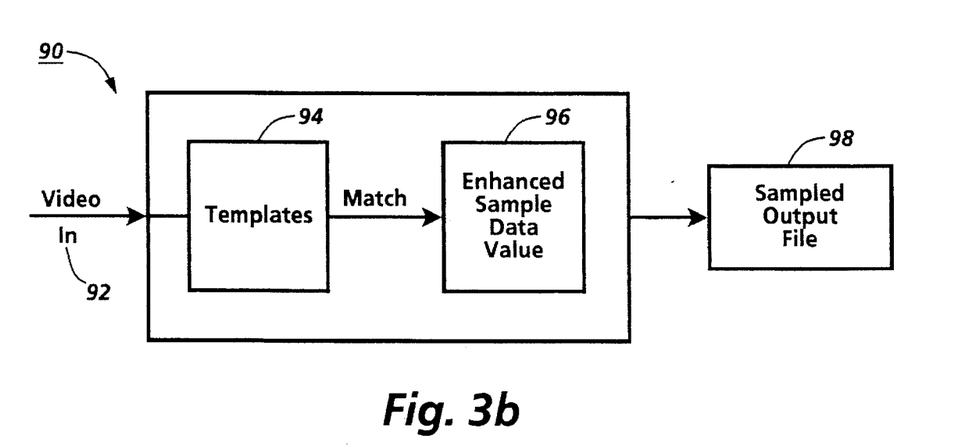

FIGS. 3(a) and 3(b) illustrate in more detail the difference between prior pixel enhancement systems and the system of the present invention. FIG. 3(a) shows an existing image processing subsystem 80. A binary Video In signal 82, representing the bitmap image, is input to the subsystem. Templates 84 are tested against the input, and appropriate matches are identified. An enhanced binary pixel pattern 86 is generated representing the enhancement to a corrected pixel, and the enhanced outputs are sent directly to the photoreceptor 88 of a printer.

FIG. 3(*b*) illustrates a system of the present invention. A binary Video In signal 92, representing the bitmap image, is input to the subsystem. The bitmap image might be a 300 spi binary image, for example. Templates 94 are tested against the input, and appropriate matches are identified. Sample data values 96 are determined and generated representing enhancements for a corrected pixel. Sample Output File 98 may be sent to a printer for processing for printer specific characteristics or stored electronically. The numerical enhancement data values replace the binary pixel patterns 86 of FIG. 3(a). Sample Output File 98 provides to a high-addressability printer what a scanner would provide if it were to scan a corrected, non-stairstepped line. Sample Output File 98 could be provided directly to the high-addressability printer electronics for processing, or be stored or sent elsewhere via a network. In this way, the method of the invention enables an image processing system to obtain the benefits of high-addressability while using the large existing infrastructure of low resolution binary images.

B. An Application

FIGS. 4–7 show an example of a template matching with a portion of an image, the desired rendition of the image portion matching the template, and the resulting enhanced output according to prior pattern output methods and the sample data output method of the present invention.

Figure 4A:
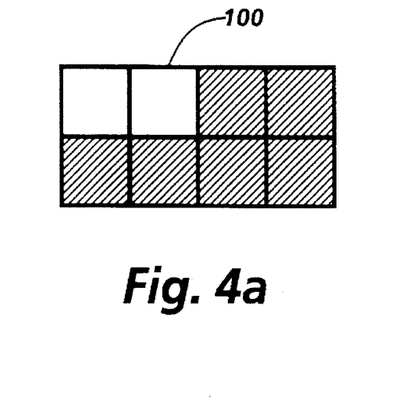
FIGS. 4(a) and 4(b) show a portion of a bitmap image forming a pixel pattern template and its relationship to an image portion.
Figure 4B:
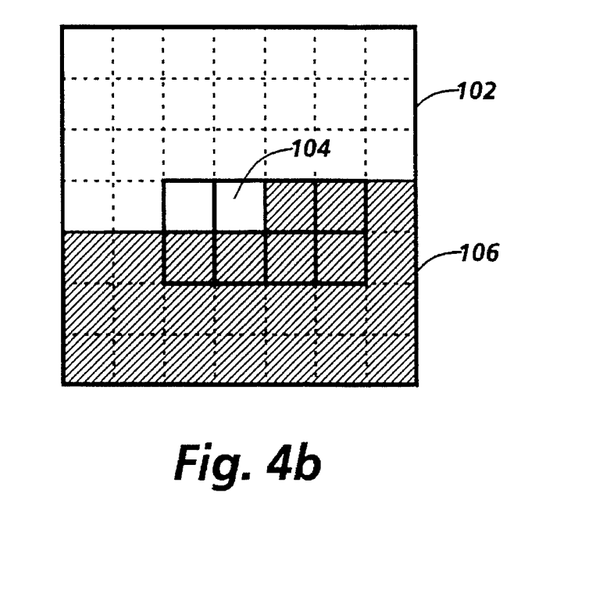

FIG. 4(*a*) shows a portion of an image forming a signal or binary pixel pattern template 100 that is stored and recognized by the image enhancement system. The template is shown in FIG. 4(*b*) in a template matching window 102. For most template matching techniques, the central pixel 104 is the target pixel for enhancement data. As the template matching window 102 moves across the image portion 106, each pixel will fall at the target pixel position, and will be enhanced if the target pixel is in a correctable pixel position in a pattern template.

Figure 5A:
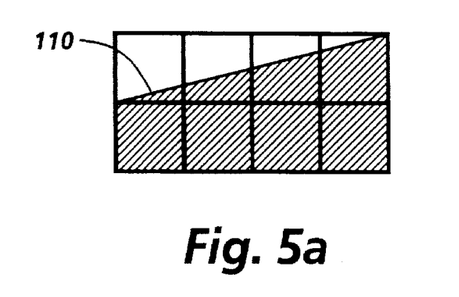
FIGS. 5(a) and (b) show the intended rendering of the template of FIG. 4. and its relationship in the image portion.
Figure 5B:
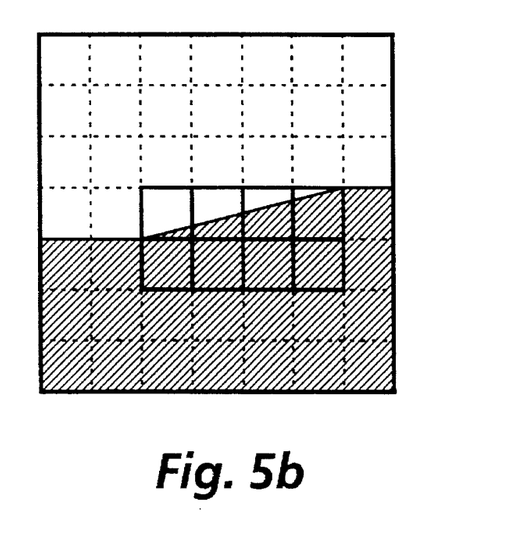

FIG. 5(*a*) shows an example of the goal for rendering the image portion, shown by edge 110, as may be perceived by the author of the template. Depending upon the author and the application, similar patterns may have different resulting enhancement goals. In FIG. 5(*b*), the desired rendition is shown in the image portion of the template matching window.

Figure 6A:
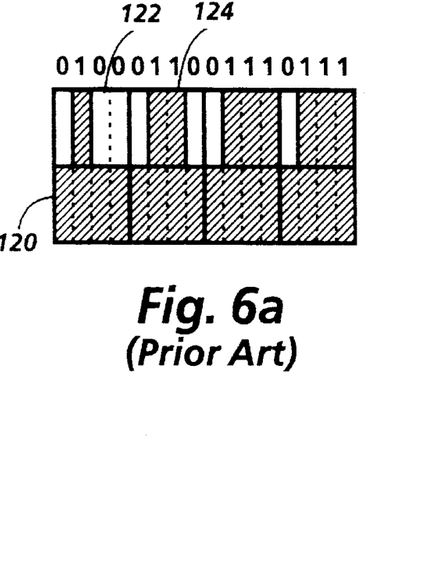
FIGS. 6(a) and (b) show an example of enhanced pixel pattern output according to prior template matching methods.
Figure 6B:
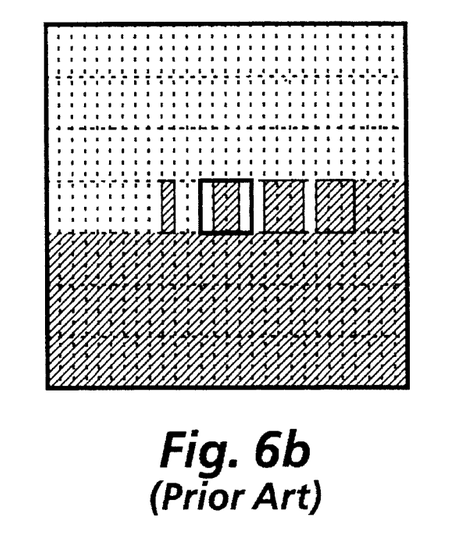

In FIG. 6(*a*), an enhanced binary pixel pattern output 120 is shown, such as produced by prior image enhancement template matching systems like that shown in FIG. 3(*a*). Four pixels are produced for each input pixel, so that the output, when printed, approximates rendering of edge 110. Such a pattern goes directly to the photoreceptor of the printer that the enhancement is designed for, and modulates the laser in the fast scan direction accordingly to produce pixel pattern 120. FIG. 6(*b*) shows the image portion in the template matching window with the enhanced portion 120.

In addition, FIG. 6(*a*) illustrates the inefficiency in pattern based enhancement outputs. In a system in which an input pixel is enhanced to tour output pixels, input pixel 122 could be described by four enhanced pixels (0, 1, 0, 0), and pixel 124 by four enhanced pixels (0, 1, 1, 0). However, if pixel 122 were described by the pixel values (0, 0, 1, 0), or (0, 0, 0, 1), or (1, 0, 0, 0), the printed output would look essentially the same, with one of the four expanded enhancement pixels of the input pixel made black. So with four bits of data (n), there are effectively five levels (n+1) of output intensity in an enhanced bit output system. Due to this redundancy, it can be seen that the rendering precision of the enhanced pixels increases linearly with the number of bits n in pattern output systems.

Figure 7A:
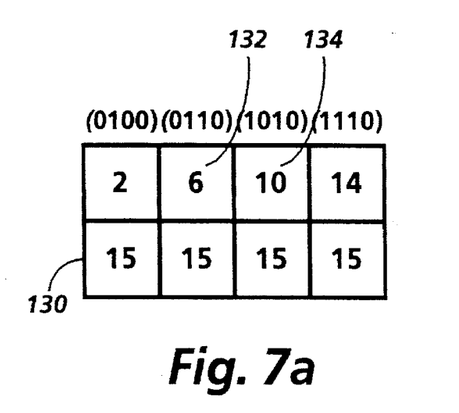
FIGS. 7(a) and (b) show the enhanced sample data output according to the method of the present invention.
Figure 7B:
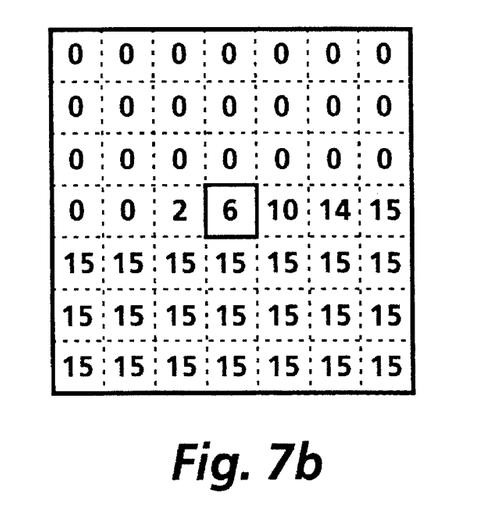

FIG. 7 shows enhanced output data 130 such as would be produced by the system of FIG. 3(*b*), with multiple-bit-per-pixel numerical sample, or grayscale, enhancement outputs instead of the two dimensional pattern of binary pixels produced in FIG. 6(*a*). Sample output data has the advantage that it is not dependent upon the device that will print it, and it is flexible in that a printer may render the sample output data in accordance with its own rules, for its own characteristics. The output will be processed for the characteristics of the particular printer that is printing it before sending it to the photoreceptor. The file of sampled enhanced data values may be transferred, for example, over a network, to any number of different printers with different characteristics and display resolutions.

In addition, sample output increases the precision of the enhancement data. In numerical sample or grayscale enhancement data, pixel 132 has a value of (0110). This may produce a different output than pixel 134, which has a sample value of (1010), on a high-addressability printer. Sampled output therefore increases the rendering precision of enhanced output data exponentially by $2^n$ with the number of bits n.

Figure 8:
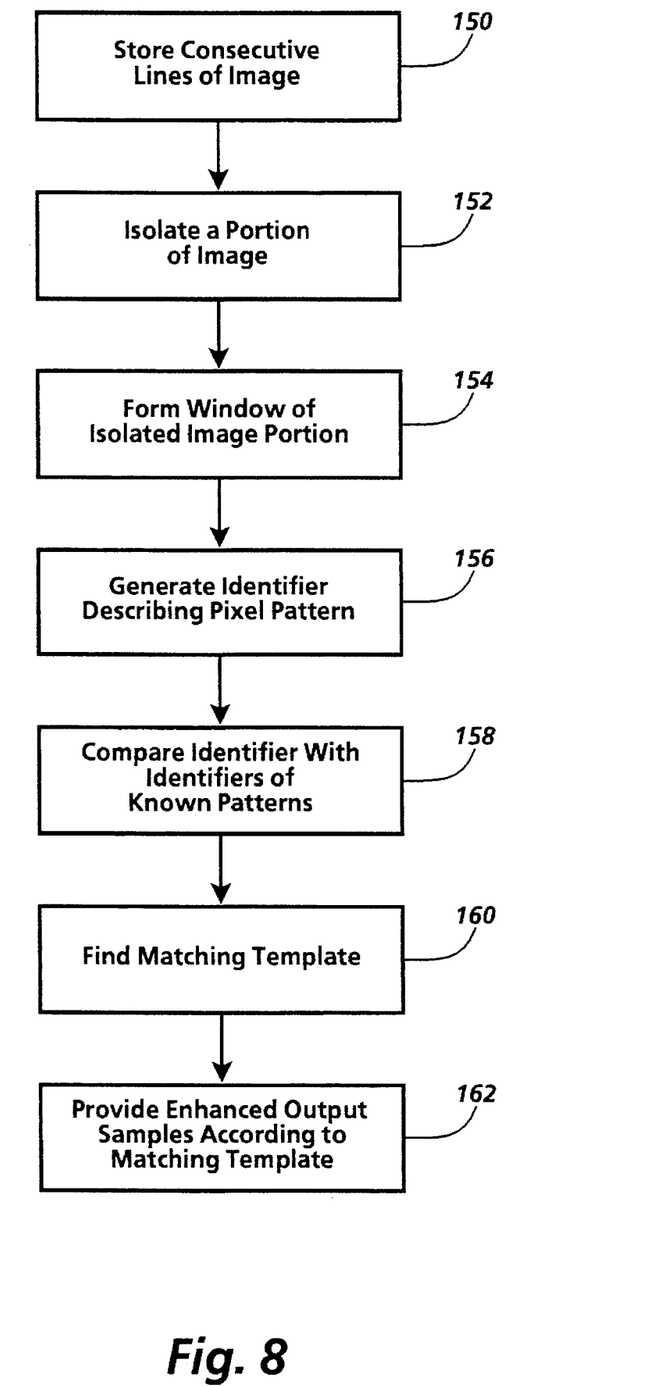
FIG. 8 shows a flowchart illustrating steps for performing the method of the invention for enhancing a portion of an image.

The flowchart of FIG. 8 shows steps for an embodiment of the present method of enhancing a portion of an image using template matching to identify the pixel for enhancement. For example, a hierarchical template matching scheme such as described in U.S. Pat. No. 5,329,599 "ENHANCED FIDELITY REPRODUCTION OF IMAGES BY HIERARCHICAL TEMPLATE MATCHING," previously incorporated, may be used to identify a matching template. The step in box 150 stores consecutive lines of an image. The step in box 152 isolates a portion of the image. The step in box 154 forms a window in the isolated portion of the image. This window may be a symmetrical set of pixels around a target pixel.

The step in box 156 generates an identifier describing the pixel pattern of the pixels in the window including the target pixel. The step in box 158 compares the identifier of the pixel pattern in the window with the identifiers of known pixel patterns, or templates. The step in box 160 finds a matching template, and the step in box 162 provides sampled enhancement data for the target pixel, according to the enhancement data for the matched template. In this embodiment, enhancement data samples would be determined for each target pixel based on the highest priority matching template. Both the templates of box 160, and the related sampled enhancement data results for each template may be defined by a user of the system.

Figure 9:
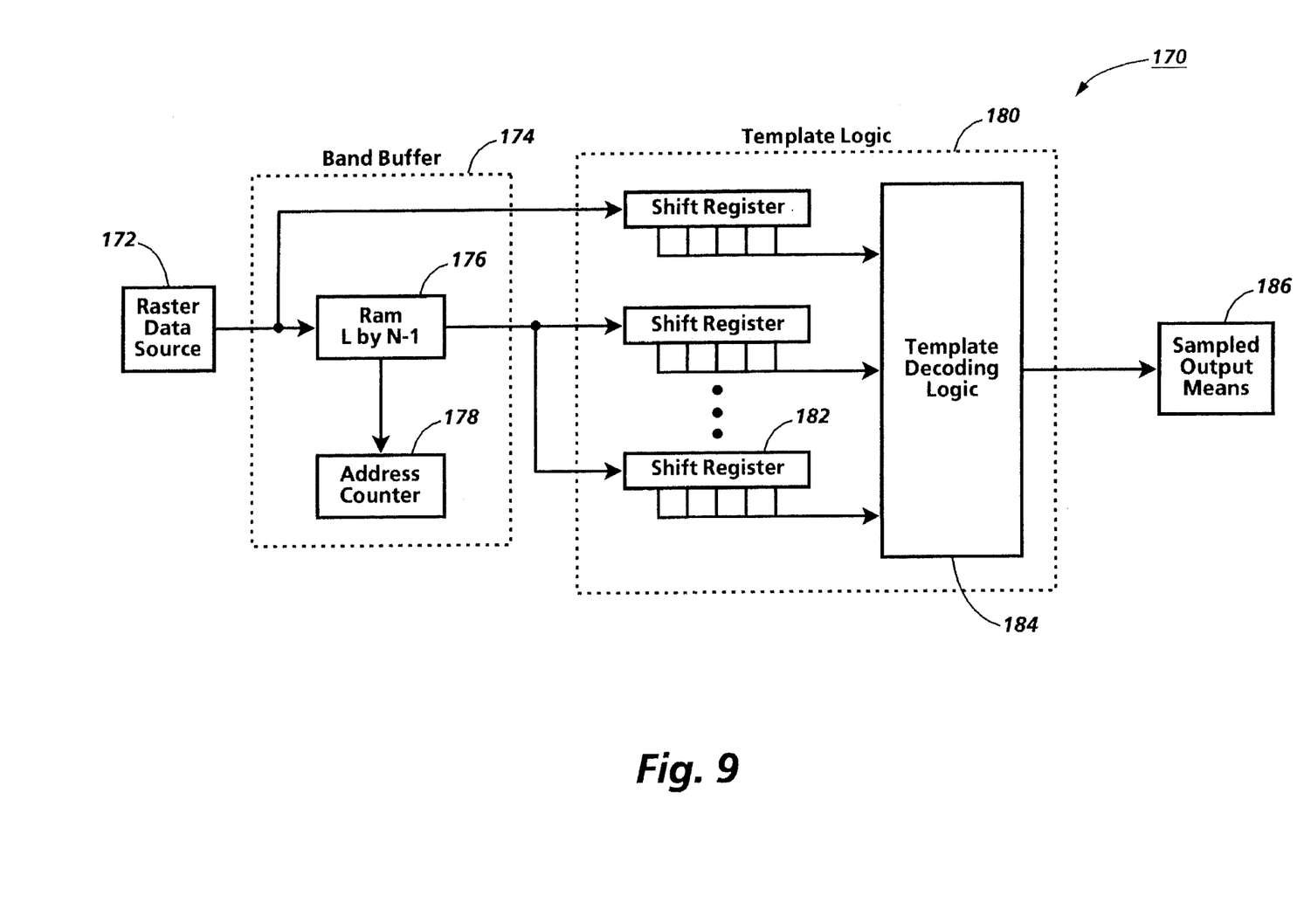
FIG. 9 shows a block diagram of an apparatus for performing image enhancement in accordance with one embodiment of the present invention.

FIG. 9 shows a block diagram of an apparatus 170 for performing image enhancement in accordance with one embodiment of the present invention. Raster Data Source 172 provides serial raster data to Band Buffer 174, formed by RAM 176 controlled by Address Counter 178. RAM 176 stores a field of (L×N−1), where L is the number of bits in a line of the input, and N is the height of the input window. The Nth line is shifted directly into the shift register 182 to form an N height window. The number of bits in a line L will vary by the input data source, for example, for a CRT the line length may be 1000 bits, but for a large-scale printer the number of bits in a line may be 8000 bits. On a typical laser printer with number of bits per line L of 300 spi for an 1-inch line, a typical RAM size for implementing an 11×11 window may be about (3300 bits ×11 lines). RAM 176 and Address Counter 178 form a circular band buffer which steps line by line through the input. Alternatively, the band buffer could be made up of a series of shift registers which perform the same function. Band Buffer 174 provides input data lines to Template Logic 180.

Template Logic 180 is made up of a plurality of shift registers 182. There are N shift registers, one for each line of the input window. The shift registers 182 input data into Template Decoding Logic 184 to form the input window. In Template Decoding Logic 184, the input window is examined for matches with an author-defined set of templates. Template Decoding Logic 184 examines primarily the pixels around the center axis of the input window, but data for the entire input window may be received from the shift registers 182. Template Decoding Logic 184 may compare the data with templates either serially or in parallel. The sampled enhancement data the corrected pixel is output from Template Logic 180 to sample output means 186. Sample output means may provide the enhancement data samples to memory or a network for storage, or may send the output directly to a high-addressability printer for processing for printing.

C. Miscellaneous

In addition to enhancing the fidelity of bitmap images, high-addressability systems using numerical sample data may perform electronic erosion, dilation, or other image processing by adjusting the output determined by the author of the enhancement templates.

Although the present invention has been described in terms of grayscale output images on black and white printers, it is understood that having digital images encoded in sampled format is also important for color printers, where sampled image files offer the only practical way to maintain the full fidelity of natural images.

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

What is claimed is:

1. A method of enhancing the fidelity of reproduction of an image represented by a plurality of binary pixels at a first resolution on a microaddressable display system which receives numerical sample data representing pixels, comprising the steps of:

storing a portion of pixels representing an image portion in a first storage;

isolating a region of the pixels of said image portion to form a window including a formation of pixels including a target pixel;

comparing a group of pixels encompassing said pixel formation including said target pixel within said window with a set of pixel patterns, said pixel patterns including correctable pixel positions;

identifying a matching pixel pattern in which said target pixel is in one of said correctable pixel positions; and producing a sampled, device-independent multiple-bit coded number representing said target pixel at said first resolution according to enhancement data for the correctable pixel position of said target pixel position in said matching pixel pattern.

2. The method of claim 1 wherein said multiple-bit coded number enhancement data is based on numerical coding of gray levels.

3. The method of claim 1 in which the comparing step comprises comparing said group of pixels with a set of templates representing contours at different angles.

4. The method of claim 1 wherein said window comprises said target pixel and a symmetrical formation of pixels surrounding said target pixel.

5. The method of claim 1 wherein the step of isolating said window comprises forming a matrix of M number of consecutive pixels in N number of consecutive lines to form a M×N window defining the region of the image portion having said target pixel at the center of the matrix.

6. The method of claim 1 wherein the step of identifying the matching pixel pattern includes the step of generating unique identifying signals in accordance with the particular match determined.

7. The method of claim 6 wherein the step of identifying the matching pixel pattern includes the step of producing a default identifying signal in response to finding no match in set of pixel patterns.

8. The method of claim 7 wherein the step of producing the multiple-bit coded number representing said target pixel includes producing a value representative of said target pixel in response to said default identifying signal.

9. A method of enhancing the contour fidelity of reproduction of an image represented by a plurality of signals on an overscanned microaddressable display system, comprising the steps of:

storing a portion of the signals representing an image portion;

isolating a region of the signals of said image portion to form a window including a formation of signals including a target signal;

comparing a group of signals encompassing said signal formation including said target signal within said window with a set of stored signal patterns;

identifying a matching signal pattern; and determining for said target signal a sampled, device-independent multiple-bit coded number from a look-up table corresponding to the matching signal pattern in said set stored signal of patterns.

10. The method of claim 9 wherein the step of comparing includes the step of comparing signals in said window with signal patterns of a set of standard signal formats to determine equivalence to at least one of the patterns; and the step of identifying the matching signal pattern includes the step of generating unique identifying signals in accordance with the particular equivalence determined.

11. The method of claim 9 wherein said multiple-bit coded number is based on numerical coding of gray levels.

12. An overscanned microaddressable display system for enhancing the contour fidelity of reproductions of a binary image represented by a plurality of pixels, comprising:

means for receiving pixels of the image, said pixels representing at least portions of successive lines of the image;

first memory means for storing a portion of said pixels;

means for isolating a region of said pixels to form a composite pixel pattern;

a source of standard pixel patterns;

means for comparing said composite pixel pattern with said standard pixel patterns;

logic means responsive to the comparison for producing logic signals representative of the comparison; and enhancing means responsive to said logic signals to produce device-independent multiple-bit enhanced data values representing each pixel of the image.

* * * * *